(12) United States Patent
Lin et al.

(10) Patent No.: US 12,422,950 B2
(45) Date of Patent: Sep. 23, 2025

(54) TOUCH SENSING READING DEVICE AND SIGNAL PROCESSING METHOD THEREOF

(71) Applicant: ILI TECHNOLOGY CORP., Hsinchu County (TW)

(72) Inventors: Yung-Fu Lin, Hsinchu County (TW); Jung-Kuei Hsu, Hsinchu County (TW); Wen-Ger Wong, Hsinchu County (TW); Chuan-Chi Fan, Hsinchu County (TW); Chia-Chun Hsu, Hsinchu County (TW); Cheng-Chung Hsu, Hsinchu County (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 19/001,379

(22) Filed: Dec. 24, 2024

(65) Prior Publication Data

US 2025/0251828 A1    Aug. 7, 2025

(30) Foreign Application Priority Data

Feb. 1, 2024   (TW) .................................. 113103896

(51) Int. Cl.
  *G06F 3/041*    (2006.01)
  *G09G 5/00*     (2006.01)

(52) U.S. Cl.
  CPC ......... *G06F 3/04166* (2019.05); *G09G 5/003* (2013.01); *G09G 2310/0264* (2013.01)

(58) Field of Classification Search
  None
  See application file for complete search history.

(56) References Cited

U.S. PATENT DOCUMENTS

| | | | |
|---|---|---|---|
| 9,151,792 B1* | 10/2015 | Kremin | G06F 1/169 |
| 2015/0227232 A1* | 8/2015 | Yao | G06F 3/04182 |
| | | | 345/174 |
| 2016/0117054 A1 | 4/2016 | Mamba et al. | |
| 2018/0173342 A1 | 6/2018 | Lee et al. | |
| 2019/0034002 A1* | 1/2019 | Anantharaman | G06F 1/32 |
| 2019/0294295 A1 | 9/2019 | Dong et al. | |
| 2021/0191561 A1 | 6/2021 | Kim | |

FOREIGN PATENT DOCUMENTS

| | | |
|---|---|---|
| CN | 111902801 | 11/2020 |
| CN | 112363003 | 2/2021 |
| CN | 114690943 | 7/2022 |
| CN | 117686794 | 3/2024 |

OTHER PUBLICATIONS

"Notice of allowance of Taiwan Counterpart Application", issued on Jan. 16, 2025, p. 1-p. 4.

* cited by examiner

*Primary Examiner* — Krishna P Neupane
(74) *Attorney, Agent, or Firm* — JCIPRNET

(57) ABSTRACT

A touch sensing reading device includes an operation circuit and an adjustment circuit. The operation circuit includes a feedback capacitor, receives a sensing signal through a first input terminal, receives a driving signal through a second input terminal, and feedbacks an output signal via an output terminal through the feedback capacitor and the first input terminal. The adjustment circuit provides an adjustment signal to the first input terminal of the operation circuit, and adjusts the output signal. A first sub-signal in the adjustment signal is set based on the inverted signal of the driving signal. A second sub-signal in the adjustment signal is set based on the inverted signal of the sensing signal.

13 Claims, 4 Drawing Sheets

TOUCH SENSING READING DEVICE AND SIGNAL PROCESSING METHOD THEREOF

CROSS-REFERENCE TO RELATED APPLICATION

This application claims the priority benefit of Taiwan application serial no. 113103896, filed on Feb. 1, 2024. The entirety of the above-mentioned patent application is hereby incorporated by reference herein and made a part of this specification.

BACKGROUND

Technical Field

The present invention relates to a touch sensing reading technology, and particularly to a touch sensing reading device and a signal processing method thereof.

Description of Related Art

With the increasingly widespread application of touch-enabled devices, the associated technologies for touch sensing have become progressively more significant. In self-capacitance touch devices, the capacitive sensing method utilizes charge transfer, whereby the entirety of the electrical charge generated by the self-capacitance touch capacitor during a touch event is transferred to the internal capacitor of the touch device. Subsequently, the internal capacitor processes the aforementioned touch event correspondingly based on the received electrical charge. This methodology results in a situation where, when there exists a substantial disparity between the capacitance values of the self-capacitance touch capacitor and the internal capacitor, the internal capacitor might experience difficulty in receiving the electrical charge from the self-capacitance touch capacitor.

SUMMARY

The present invention provides a self-capacitance sensing device and a signal processing method thereof, which may allow the self-capacitance sensing device to receive sensing signals with large voltage without the need for an internal feedback capacitor with a larger capacitance value, and enable the internal feedback capacitor to accurately sense whether changes have occurred in the sensing signal.

A touch sensing reading device of the invention includes an operation circuit and an adjustment circuit. The operation circuit includes a feedback capacitor, receives a sensing signal through a first input terminal, receives a driving signal through a second input terminal, and feedbacks an output signal via an output terminal through the feedback capacitor and the first input terminal. The feedback capacitor is coupled to the first input terminal of the operation circuit. The adjustment circuit is coupled to the first input terminal of the operation circuit, provides an adjustment signal to the first input terminal of the operation circuit, and adjusts the output signal. A first sub-signal in the adjustment signal is set based on the inverted signal of the driving signal. A second sub-signal in the adjustment signal is set based on the inverted signal of the sensing signal.

The signal processing method of the present invention includes: providing an operation circuit to receive a sensing signal and a driving signal to generate an initial output signal; providing an adjustment circuit, providing an adjustment signal through the adjustment circuit, and performing an offset on the initial output signal according to the adjustment signal to generate an output signal; and receiving the output signal through a feedback capacitor of the operation circuit. A first sub-signal in the adjustment signal is set based on an inverted signal of the driving signal. A second sub-signal in the adjustment signal is set based on an inverted signal of the sensing signal.

Based on the above, the touch sensing reading device in the embodiments of the present invention utilizes the adjustment circuit to offset the voltage values of the sensing signal and the driving signal input to the operation circuit, reducing the electric charge of the output signal of the operation circuit, thereby enabling the feedback capacitor in the operation amplifier to receive sensing signals with larger voltage. Therefore, the touch sensor of the present invention may receive sensing signals with larger voltage without the need for a larger feedback capacitor, which may also achieve the advantageous effect of saving circuit area.

DESCRIPTION OF THE EMBODIMENTS

Figure 1:
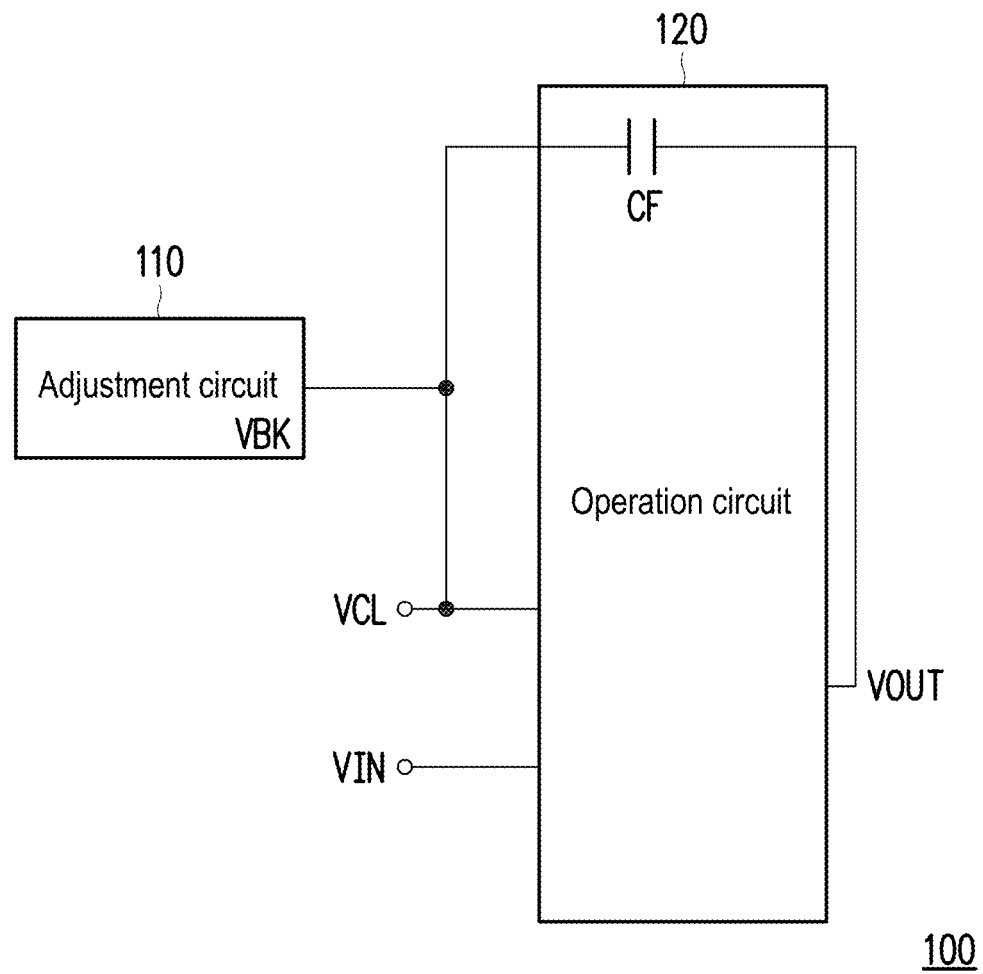
FIG. 1 illustrates a circuit diagram of a touch sensing reading device according to an embodiment of the present invention.

FIG. 1 illustrates a circuit diagram of a touch sensing reading device 100 according to an embodiment of the present invention. The touch sensing reading device 100 may be applied in electronic devices serving as input devices, such as consumer electronic devices like tablet computers, smartphones, etc., and is not limited to any specific display technology of the electronic devices. In other words, the display technology of the electronic devices may be active matrix organic light-emitting diode (AMOLED). Referring to FIG. 1, the touch sensing reading device 100 includes an adjustment circuit 110 and an operation circuit 120. The output terminal of the adjustment circuit 110 is coupled to the first input terminal of the operation circuit 120, and the operation circuit 120 has a feedback capacitor CF. The operation circuit 120 may receive a sensing signal VCL through the first input terminal, and receive a driving signal VIN through the second input terminal.

The operation circuit 120 receives the sensing signal VCL and the driving signal VIN to generate an initial output signal. The adjustment circuit 110 may provide an adjustment signal VBK to the first input terminal of the operation circuit 120, and offset the initial output signal of the operation circuit 120. The operation circuit 120 may generate an output signal VOUT based on the adjustment signal VBK and the initial output signal.

The feedback capacitor CF of the operation circuit 120 is set between the output terminal and the first input terminal of the operation circuit 120. The operation circuit 120 may feedback the output signal VOUT from the output terminal to the first input terminal through the feedback capacitor CF. It is worth noting that the driving signal VIN may be a sine wave signal. The sensing signal VCL and the adjustment signal VBK simultaneously have signals with sine part and cosine part.

In this embodiment, the adjustment signal VBK has a first sub-signal and a second sub-signal. The first sub-signal of the adjustment signal VBK may be set based on the inverted signal of the driving signal VIN, configured to offset the voltage value of the driving signal VIN transmitted to the operation circuit 120. In other words, the first sub-signal of the adjustment signal VBK may also be a sine wave signal. The second sub-signal of the adjustment signal VBK may be configured to offset the voltage value of the sensing signal VCL transmitted to the operation circuit 120. The second sub-signal of the adjustment signal VBK includes a sine unit part and a cosine unit part. The sine unit part may offset the sine part of the sensing signal VCL by the multiple thereof, and the cosine unit part may offset the cosine part of the sensing signal VCL by the multiple thereof.

In this embodiment, the operation circuit 120 utilizes the adjustment signal VBK to offset the initial output signal, resulting in a smaller output signal VOUT. The touch sensing reading device 100 is able to receive a sensing signal with a larger voltage without the need to use a larger feedback capacitor, and is able to determine whether the sensing signal VCL has changed through the variation of the signal VOUT.

In an embodiment of this invention, a part of the output signal VOUT received to the driving signal VIN may be completely offset by the first sub-signal of the adjustment signal VBK. A part of the output signal VOUT received to the sensing signal VCL may be offset by the sine unit part and cosine unit part of the second sub-signal of the adjustment signal VBK. In an ideal situation, the output signal VOUT may equal the remainder of the sine wave voltage part of the sensing signal VCL divided by the sine unit part of the second sub-signal, plus the remainder of the cosine wave voltage part of the sensing signal VCL divided by the cosine unit part of the second sub-signal.

Figure 2A:
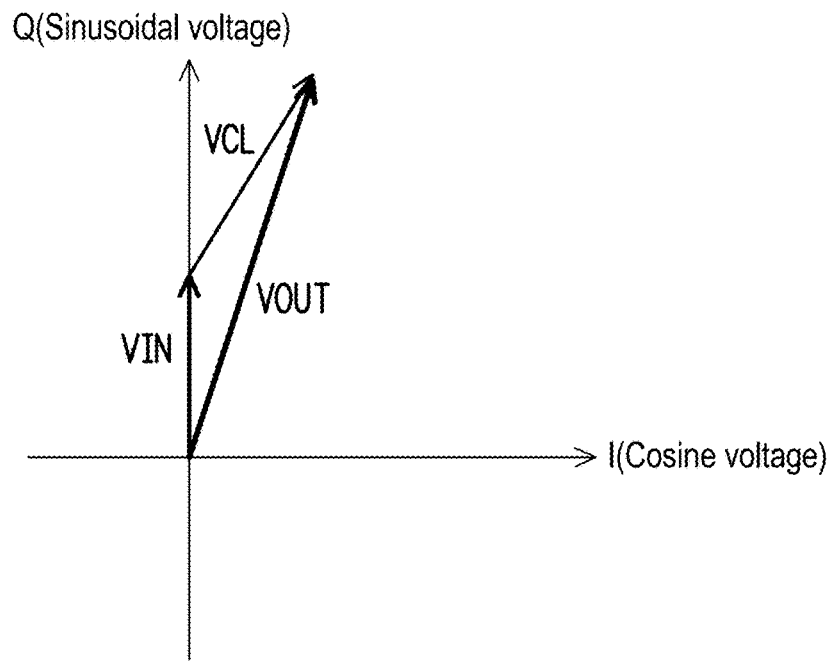
FIG. 2A illustrates a signal vector diagram according to an embodiment of the present invention.
Figure 2B:
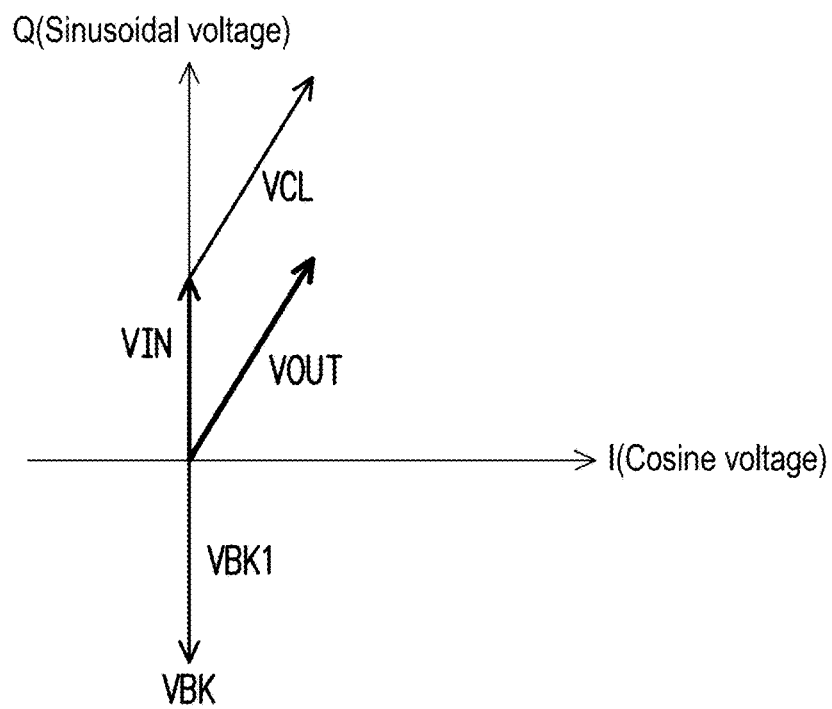
FIG. 2B illustrates a signal vector diagram according to an embodiment of the present invention.
Figure 2C:
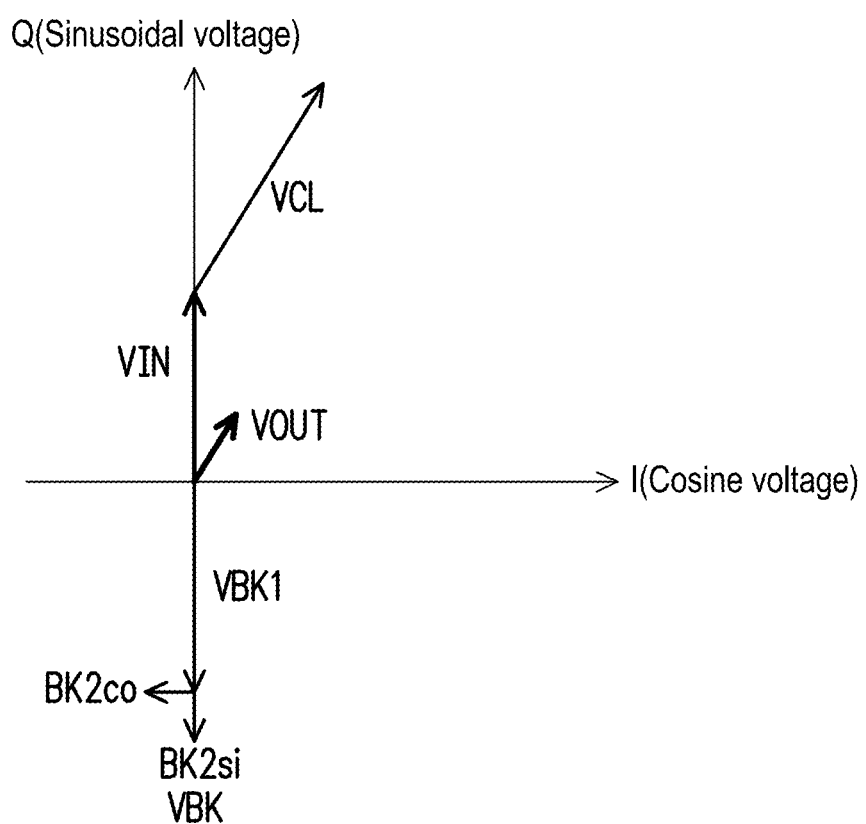
FIG. 2C illustrates a signal vector diagram according to an embodiment of the present invention.

Please refer to FIG. 2A to FIG. 2C. FIG. 2A to FIG. 2C all illustrate signal vector diagrams in an embodiment of this invention. In FIG. 2A, the operation circuit only receives the sensing signal VCL and the driving signal VIN, and the adjustment circuit does not provide the adjustment signal VBK. The driving signal VIN is a sine wave signal, while the sensing signal VCL and the adjustment signal VBK simultaneously have sine part and cosine part. The output signal VOUT has a part received to the sensing signal VCL and a part received to the driving signal VIN. The output signal VOUT in FIG. 2A may also be considered as the aforementioned initial output signal.

In FIG. 2B, the operation circuit receives the sensing signal VCL and the driving signal VIN, and the adjustment circuit provides the first sub-signal VBK1 of the adjustment signal VBK. A part of the output signal VOUT received to the driving signal VIN is offset by the first sub-signal VBK1 of the adjustment signal VBK. The output signal VOUT in FIG. 2B may equal the voltage value of the driving signal VIN. Therefore, the touch sensing reading device 300 using a larger driving signal VIN does not affect the output signal VOUT.

In FIG. 2C, the operation circuit receives the sensing signal VCL and the driving signal VIN, and the adjustment circuit provides the first sub-signal VBK1 of the adjustment signal VBK. A part of the output signal VOUT received to the driving signal VIN is offset by the first sub-signal VBK1 of the adjustment signal VBK. The output signal VOUT in FIG. 2B may equal the voltage value of the sensing signal VCL.

In FIG. 2C, the operation circuit receives the sensing signal VCL and the driving signal VIN, and the adjustment circuit provides the first sub-signal VBK1 and the second sub-signal VBK2 of the adjustment signal VBK. The second sub-signal VBK2 has a sine unit part VBK2$si$ and a cosine unit part VBK2$co$. The second sub-signal VBK2 and the sensing signal VCL may be signals of different magnitudes in opposite directions. A part of the output signal VOUT received to the driving signal VIN is offset by the first sub-signal VBK1 of the adjustment signal VBK. A part of the output signal VOUT received to the sensing signal VCL is offset by the sine unit part VBK2$si$ and the cosine unit part VBK2$co$. The output signal VOUT in FIG. 2C may equal the remainder of the sine wave voltage part of the sensing signal VCL divided by the sine unit part VBK2$si$, plus the remainder of the cosine wave voltage part of the sensing signal VCL divided by the cosine unit part VBK2$co$. For example, if the sine unit part VBK2$si$ has x units of sine wave voltage, and the cosine unit VBK2$co$ has y units of cosine voltage, the sine wave voltage part of the output signal VOUT may be 0.5x units of sine wave voltage, and the cosine wave voltage part of the output signal VOUT may be 0.5y units of cosine wave voltage. Additionally, when there is no remainder, the sine wave voltage part of the output signal VOUT may be x units of sine wave voltage, and the cosine wave voltage part of the output signal VOUT may be y units of cosine wave voltage.

Figure 3:
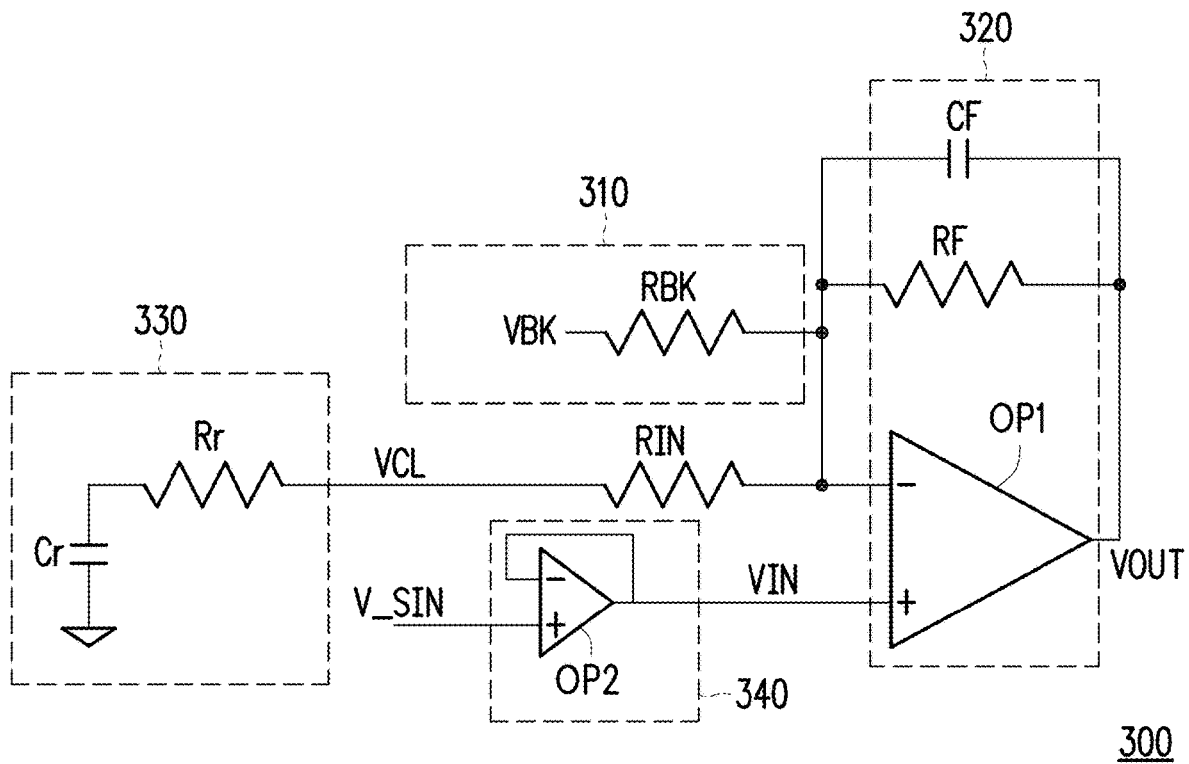
FIG. 3 illustrates a circuit diagram of a touch sensing reading device according to another embodiment of the present invention.

Please refer to FIG. 3. FIG. 3 illustrates a circuit diagram of a touch sensing reading device according to another embodiment of the present invention. In FIG. 3, the touch sensing reading device 300 includes an adjustment circuit 310, an operation circuit 320, a self-capacitance touch circuit 330, and a voltage follower 340. The output terminal of the adjustment circuit 310 is coupled to the first input terminal of the operation circuit 320. The output terminal of the self-capacitance touch circuit 330 is coupled to the first input terminal of the operation circuit 320 through an input resistor RIN. The output terminal of the voltage follower 340 is coupled to the second input terminal of the operation circuit 320.

The adjustment circuit 310 may include an adjustment resistor RBK. The adjustment resistor RBK may receive the voltage VBK. The voltage value of the adjustment signal RBK transmitted to the operation circuit 320 may be set by adjusting the magnitude of the adjustment resistor RBK. In other words, when the self-capacitance sensing amount of the touch sensing reading device is large, the adjustment resistor RBK may be selected with a lower resistance value to offset the sensing signal VCL and the driving signal VIN.

The operation circuit 320 may include a feedback capacitor CF, a feedback resistor RF, and an operation amplifier OP1. The feedback capacitor CF is coupled between the output terminal and the inverting input terminal of the operation amplifier OP1. Similarly, the feedback resistor RF is coupled between the output terminal and the inverting input terminal of the operation amplifier OP1. The inverting input terminal of the operation amplifier OP1 may be the first input terminal of the operation circuit 320, that is, the inverting input terminal of the operation amplifier OP1 may be coupled to the adjustment circuit 310 and the self-capacitance touch circuit 330. The non-inverting input terminal of the operation amplifier OP1 may be the second input terminal of the operation circuit 320, that is, the non-inverting input terminal of the operation amplifier OP1 may be coupled to the voltage follower 340.

The self-capacitance touch circuit 330 may include a self-capacitance touch capacitor Cr and a resistor Rr. The self-capacitance touch capacitor Cr is utilized to sense the user's touch action to generate the sensing signal VCL. The self-capacitance touch circuit 330 may transmit the sensing signal VCL to the first input terminal of the operation circuit 320.

The voltage follower 340 may include an operation amplifier OP2. The non-inverting input terminal of the operation amplifier OP2 may receive a sine wave signal V_SIN to generate a driving signal VIN. The output terminal of the operation amplifier OP2 may be coupled to the inverting input terminal, feeding back the driving signal VIN from the output terminal to the inverting input terminal. Moreover, the operation amplifier OP2 may transmit the driving signal VIN to the second input terminal of the operation circuit 320. Furthermore, according to the virtual ground characteristic of the negative feedback of the operation amplifier OP1 in the operation circuit 320, the inverting input terminal of the operation amplifier OP1 may have the voltage value of the driving signal VIN. The voltage value of the driving signal VIN may be used to drive the self-capacitance touch capacitor Cr, enabling the self-capacitance touch capacitor Cr to sense the user's touch action.

It is worth mentioning that the feedback resistor RF, serving as the negative feedback resistor in the operation circuit 320, may be used to transform the voltage value of the output signal VOUT, allowing the feedback capacitor CF to receive the electric charge corresponding to the voltage value of the output signal VOUT. The touch sensing reading device 300 may also design the magnitude of the adjustment signal VBK through the magnitude ratio of the feedback resistor RF and the adjustment resistor RBK.

In this embodiment, the touch sensing reading device may be used in larger self-capacitance sensing quantities. For example, in the situation where a feedback capacitor CF with a capacitance value of 40 pF is used, the capacitance value of the self-capacitance touch capacitor Cr may be greater than 400 pF. The self-capacitance touch circuit 330 transmits the electric charge stored in the self-capacitance touch capacitor Cr to the operation circuit 320 in the form of the sensing signal VCL. The operation circuit 320 utilizes the adjustment signal VBK received from the adjustment circuit 310, allowing the feedback capacitor CF to receive the output signal VOUT. In this embodiment, the electric charge of the output signal VOUT may be less than the electric charge of the sensing signal VCL.

Figure 4:
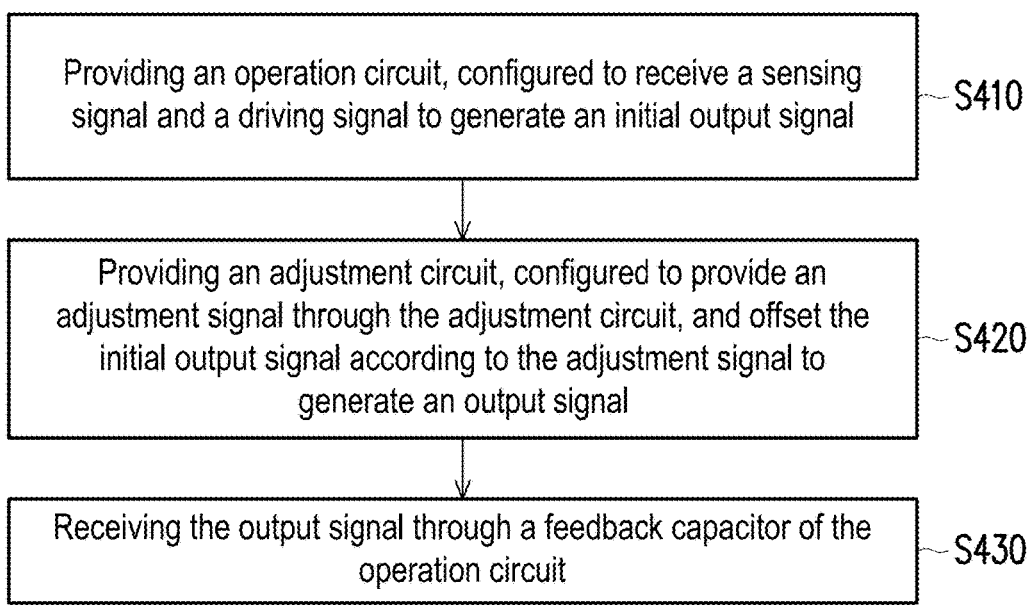
FIG. 4 illustrates a flowchart of a signal processing method according to an embodiment of the present invention.

Referring to FIG. 4, FIG. 4 illustrates a flowchart of a signal processing method according to an embodiment of the present Invention. In step S410, this embodiment provides an operation circuit for receiving a sensing signal and a driving signal to generate an initial output signal. In step S420, this embodiment provides an adjustment circuit, through which an adjustment signal is provided, and according to the adjustment signal, the initial output signal is offset to generate an output signal. In step S430, this embodiment may receive the output signal through the feedback capacitor of the operation circuit. In this embodiment, the first sub-signal in the adjustment signal in step S420 may include a sine unit part, which may be used to eliminate the sine part of the driving signal. The second sub-signal may include a sine unit part and a cosine unit part, where the sine unit part or the multiple thereof may be used to offset the sine part of the sensing signal, while the cosine unit part or the multiple thereof may be used to offset the cosine part of the sensing signal. Regarding the implementation details of the above steps, detailed explanations have been provided in the aforementioned multiple embodiments.

In summary, the touch sensing reading device in the embodiments of the present invention applies an adjustment circuit to offset the voltage values of the sensing signal and the driving signal input to the operation circuit, reducing the voltage value of the output signal of the operation circuit. This allows the feedback capacitor in the operation amplifier to receive sensing signals with larger voltages without using a larger capacitance value, which may also achieve the advantageous effect of saving circuit area.

Although the present invention has been disclosed in the above embodiments, it is not intended to limit the invention. Any person skilled in the art may make some modifications and refinements without departing from the spirit and scope of the present invention. Therefore, the scope to be protected by the present invention should be defined by the appended claims.

What is claimed is:

1. A touch sensing reading device, comprising:
an operation circuit, comprising a feedback capacitor, receiving a sensing signal through a first input terminal, receiving a driving signal through a second input terminal, feedbacking an output signal via an output terminal through the feedback capacitor and the first input terminal, wherein the feedback capacitor is coupled to the first input terminal; and
an adjustment circuit, comprising an adjustment resistor, coupled to a first input terminal of the operation circuit, providing an adjustment signal to the first input terminal of the operation circuit, adjusting the output signal through the adjustment resistor,
wherein the adjustment signal comprises a first sub-signal and a second sub-signal,
wherein the first sub-signal in the adjustment signal is set based on an inverted signal of the driving signal,
wherein the second sub-signal in the adjustment signal is set based on an inverted signal of the sensing signal.

2. The touch sensing reading device as claimed in claim 1, wherein a magnitude of the output signal is less than a magnitude of the sensing signal.

3. The touch sensing reading device as claimed in claim 1, wherein the driving signal and the first sub-signal are both sine wave voltage signals, and the second sub-signal comprises a sine unit part and a cosine unit part.

4. The touch sensing reading device as claimed in claim 3, wherein the sine unit part of the second sub-signal or a multiple thereof is utilized to offset a sine part of the sensing signal, and the cosine unit part or a multiple thereof is utilized to offset a cosine part of the sensing signal.

5. The touch sensing reading device as claimed in claim 1, wherein the operation circuit further comprises:
an operation amplifier, having a first input terminal, a second input terminal, and an output terminal, wherein the first input terminal is coupled to the adjustment circuit, and the second input terminal receives the driving signal; and
a feedback resistor, coupled between the first input terminal and the output terminal,
wherein the feedback capacitor is coupled between the first input terminal and the output terminal.

6. The touch sensing reading device as claimed in claim 5, wherein the output signal is adjusted through a ratio of magnitudes of the adjustment resistor and the feedback resistor.

7. The touch sensing reading device as claimed in claim 1, wherein a magnitude of the driving signal does not affect the output signal.

8. The touch sensing reading device as claimed in claim 1, further comprising a voltage follower, receiving a first sine wave signal to generate the driving signal.

9. A signal processing method for a touch sensing reading device, comprising:
- providing an operation circuit, configured to receive a sensing signal and a driving signal to generate an initial output signal;
- providing an adjustment circuit, configured to provide an adjustment signal through the adjustment circuit, and offset the initial output signal according to the adjustment signal to generate an output signal; and
- receiving the output signal through a feedback capacitor of the operation circuit,
- wherein a first sub-signal in the adjustment signal is set based on an inverted signal of the driving signal,
- wherein a second sub-signal in the adjustment signal is set based on an inverted signal of the sensing signal.

10. The signal processing method as claimed in claim 9, wherein a magnitude of the output signal is less than a magnitude of the sensing signal.

11. The signal processing method as claimed in claim 9, wherein the driving signal and the first sub-signal are both sine wave voltage signals, and the second sub-signal comprises a sine unit part and a cosine unit part.

12. The signal processing method as claimed in claim 11, wherein the sine unit part of the second sub-signal or a multiple thereof is utilized to offset a sine part of the sensing signal, and the cosine unit part or a multiple thereof is utilized to offset a cosine part of the sensing signal.

13. The signal processing method as claimed in claim 9, wherein a magnitude of the driving signal does not affect the output signal.

* * * * *